(12) United States Patent
Hayakawa et al.

(10) Patent No.: US 7,083,214 B2
(45) Date of Patent: Aug. 1, 2006

(54) MOVABLE SEAT FOR VEHICLES

(75) Inventors: Masato Hayakawa, Wako (JP);
Takafumi Fukushima, Wako (JP);
Kazuhiro Kishimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/147,367

(22) Filed: Jun. 8, 2005

(65) Prior Publication Data

US 2005/0275259 A1  Dec. 15, 2005

(30) Foreign Application Priority Data

Jun. 11, 2004  (JP) .............................. 2004-173634

(51) Int. Cl.
*B60N 2/14* (2006.01)
(52) U.S. Cl. .............................. 296/65.12; 296/65.07; 297/344.23; 414/921
(58) Field of Classification Search ............ 296/65.01, 296/65.03, 65.04, 65.06, 65.07, 65.11–65.15, 296/68; 414/921; 297/344.21–344.24, 13
See application file for complete search history.

(56) References Cited

U.S. PATENT DOCUMENTS

| | | | | |
|---|---|---|---|---|
| 4,155,587 A | * | 5/1979 | Mitchell | 296/65.12 |
| 4,802,706 A | * | 2/1989 | Onimaru et al. | 296/68 |
| 5,042,864 A | * | 8/1991 | Mochizuki | 296/65.07 |
| 5,524,952 A | * | 6/1996 | Czech et al. | 296/65.12 |
| 5,630,638 A | * | 5/1997 | Hirasawa et al. | 296/65.07 |
| 5,769,480 A | * | 6/1998 | Gebhardt | 296/65.12 |
| 6,024,398 A | * | 2/2000 | Horton et al. | 296/65.07 |
| 6,113,175 A | * | 9/2000 | Guim et al. | 296/65.18 |
| 6,557,919 B1 | * | 5/2003 | Suga et al. | 296/65.07 |
| 6,572,172 B1 | * | 6/2003 | Ninomiya et al. | 296/65.12 |
| 6,962,383 B1 | * | 11/2005 | Takenoshita et al. | 296/65.03 |

FOREIGN PATENT DOCUMENTS

| | | |
|---|---|---|
| JP | 8-150175 | 6/1996 |
| JP | 2001-37811 | 2/2001 |
| WO | WO 02/40226 A1 | 5/2002 |

* cited by examiner

*Primary Examiner*—D. Glenn Dayoan
*Assistant Examiner*—Greg Blankenship
(74) *Attorney, Agent, or Firm*—Squire, Sanders & Dempsey LLP

(57) ABSTRACT

In a movable seat for a vehicle, there are provided a seat body shiftable between inside and outside the vehicle passenger compartment, a seating member attached to the seat body to be movable between a first position where a sitter such as a humanoid biped robot is seated or unseated and a second position where the sitter is maintained seated, such that a location of a center of gravity of the sitter, when seated in the first position, with respect to a position of feet of the sitter is in a predetermined relationship, and a controller controlling an actuator to move the seating member toward one of the first and second positions in response to the inputted instruction, thereby enabling reliable seating, unseating, boarding and alighting, not only of elderly persons and others requiring special care but also of the humanoid robot.

11 Claims, 10 Drawing Sheets

MOVABLE SEAT FOR VEHICLES

BACKGROUND OF THE INVENTION

1. Field of the Invention

This invention relates to a movable seat for vehicles.

2. Description of the Related Art

Recent years have seen the development of various kinds of special service vehicles equipped with movable seats for facilitating boarding and alighting by handicapped persons and others requiring special care, as taught for example, in Japanese Laid-Open Patent Application Nos. Hei 8-150175 and 2001-37811. The reference '175 teaches a structural arrangement for installing a seat so that it assumes a position outside the vehicle that facilitates boarding and alighting by avoiding steps and assumes a position inside the vehicle where it is near a doorway. The reference '811 teaches an easy-to-use passenger transfer lift installed on the ceiling of an ordinary car.

On the other hand, a diverse range of newly developed humanoid biped robots has appeared. One such robot is described in Assignee's WO 2002/040226. This reference '226 teaches improvement of working efficiency in an existing working space by determining the height of the shoulder joints of a robot at standing from the floor in accordance with the height of the group of objects to be worked on.

The robot envisioned by the reference '226 is about 120 cm tall, which corresponds to the height of a child in the higher grades of elementary school. Since the robot is therefore fairly heavy, it requires the same assistance as a person needing special care, an elderly person, for instance, when being accommodated (or loaded) in a vehicle for transport. The sequence of tasks starting with seating of the robot in the vehicle and continuing on through transport to the destination, and then unseating and unloading upon arrival, particularly the seating and unseating, is hard to carry out without mishap. The technologies of the references '175 and '811 do not provide an adequate solution because they are intended for dealing with only humans and cannot cope with the loading and unloading of a robot.

SUMMARY OF THE INVENTION

An object of this invention is therefore to overcome the foregoing drawback by providing a movable seat for vehicles that enables reliable seating, unseating, boarding (loading) and alighting (unloading), not only of elderly persons and others requiring special care but also of humanoid robots.

In order to achieve the object, this invention provides a movable seat for a vehicle having a passenger compartment; comprising: a seat body shiftable between inside and outside the passenger compartment of the vehicle through a rotate/drive mechanism; a seating member attached to the seat body through a connecting mechanism to be movable between a first position where a sitter is seated or unseated and a second position where the sitter is maintained seated, such that a location of a center of gravity of the sitter, when seated in the first position, with respect to a position of feet of the sitter is in a predetermined relationship; an actuator driving the connecting mechanism to move the seating member between the first and second positions; a switch for inputting an instruction to move the seating member between the first and second positions; and a controller controlling the actuator to move the seating member toward one of the first and second positions in response to the inputted instruction.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A movable seat for vehicles according to a preferred embodiment of the present invention will now be explained with reference to the attached drawings.

Figure 1:
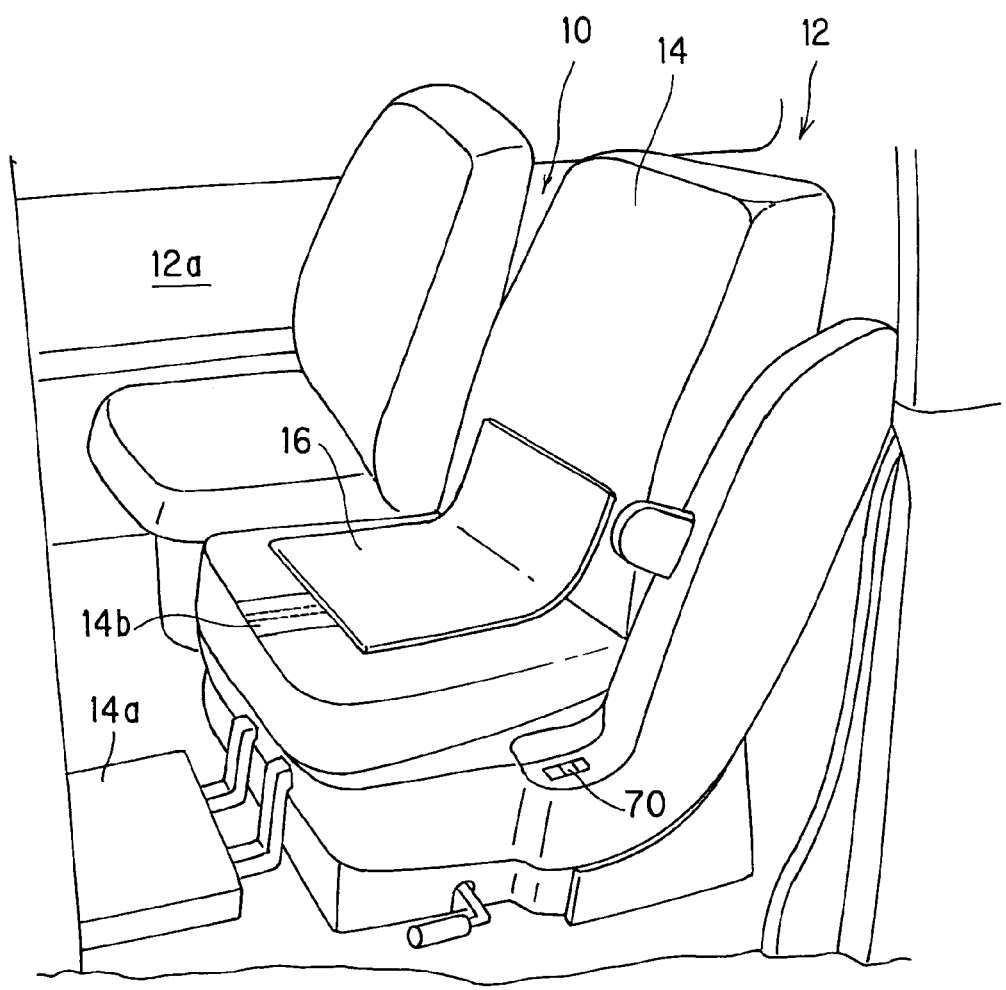
FIG. 1 is an explanatory perspective view showing an overall structure of a movable seat for vehicles according to an embodiment of the invention.
Figure 2:
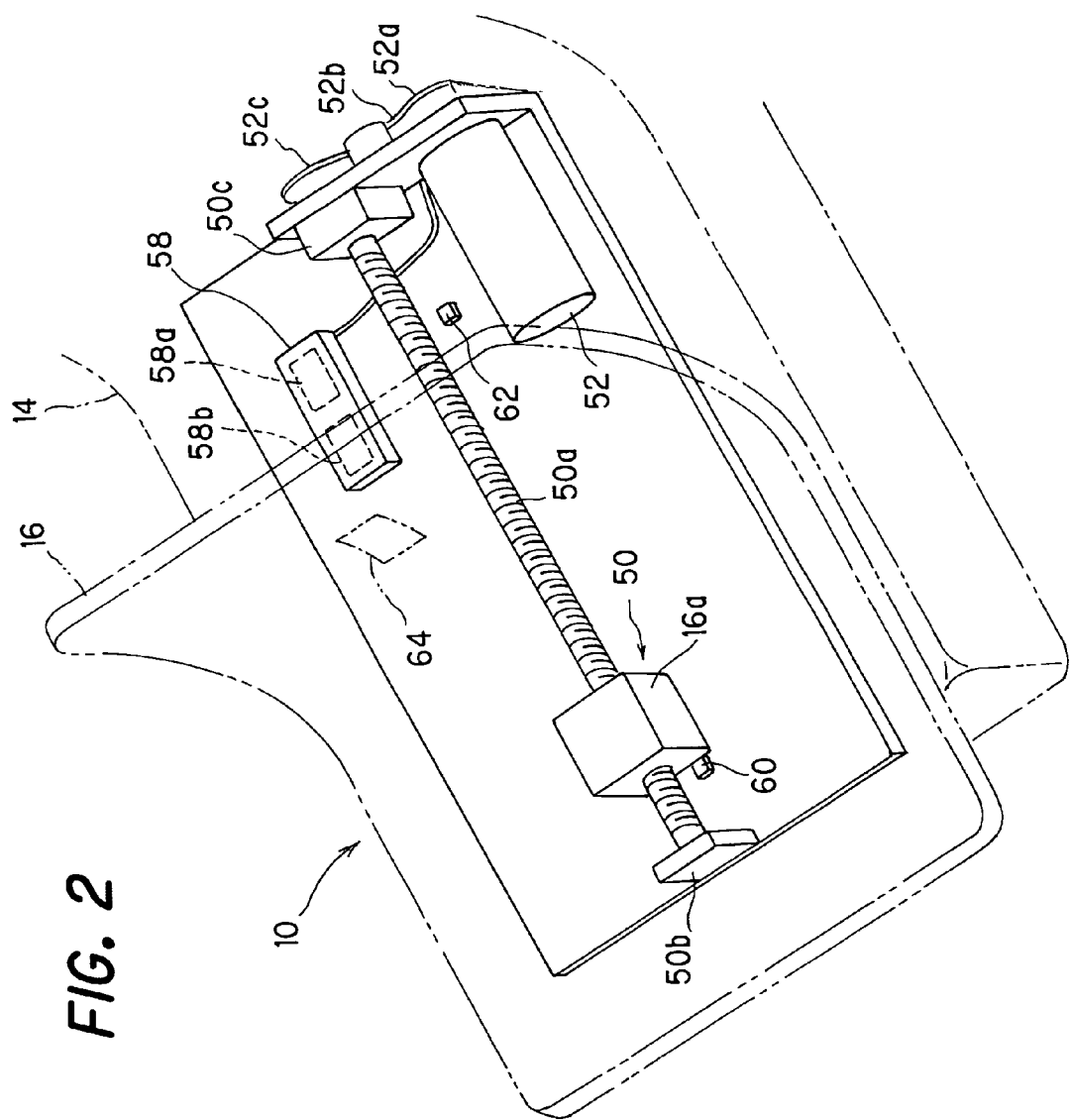
FIG. 2 is an explanatory perspective view showing the movable seat illustrated in FIG. 1 removed from the vehicle.

FIG. 1 is an explanatory perspective view showing an overall structure of a movable seat for vehicles and FIG. 2 is an explanatory perspective view showing the movable seat illustrated in FIG. 1 removed from the vehicle.

In FIGS. 1 and 2, the symbol 10 designates a movable seat 10. The movable seat 10 comprises a seat body 14 configured to be shiftable or movable between inside and outside a passenger compartment 12a of a vehicle 12 through a conventional rotate/drive mechanism (not shown) and a seating member 16 movably attached to the seat body 14. The seat body 14 is shaped similarly to those of conventional special service vehicles and has a foot rest 14a at its lower portion.

The seating member 16 is made of a relatively thin plate formed to match the shape of the surface of the seat body 14. Like the surface, more precisely the upper surface side of the seat body 14, the upper surface side of the seating member 16 is formed of an elastic material that exhibits appropriate cushioning when the sitter (person or robot to be seated) is seated, and the back, more precisely, the undersurface side thereof is formed of a material of relatively high rigidity. The undersurface side of the seating member 16 is attached to a connecting or slide mechanism (explained later) through a fixture or mounting element 16a, thereby movably connecting the seating member 16 to the seat body 14.

The explanation with reference to FIGS. 1 and 2 will be continued after explaining the sitter anticipated to be seated (accommodated) on the movable seat 10 of this embodiment.

In this embodiment, the sitter is anticipated to be a robot, specifically a legged mobile robot, still more specifically a humanoid biped robot. As explained earlier regarding the object of the invention, however, the sitter can instead be a person needing special care (an elderly or handicapped person, for example).

Figure 3:
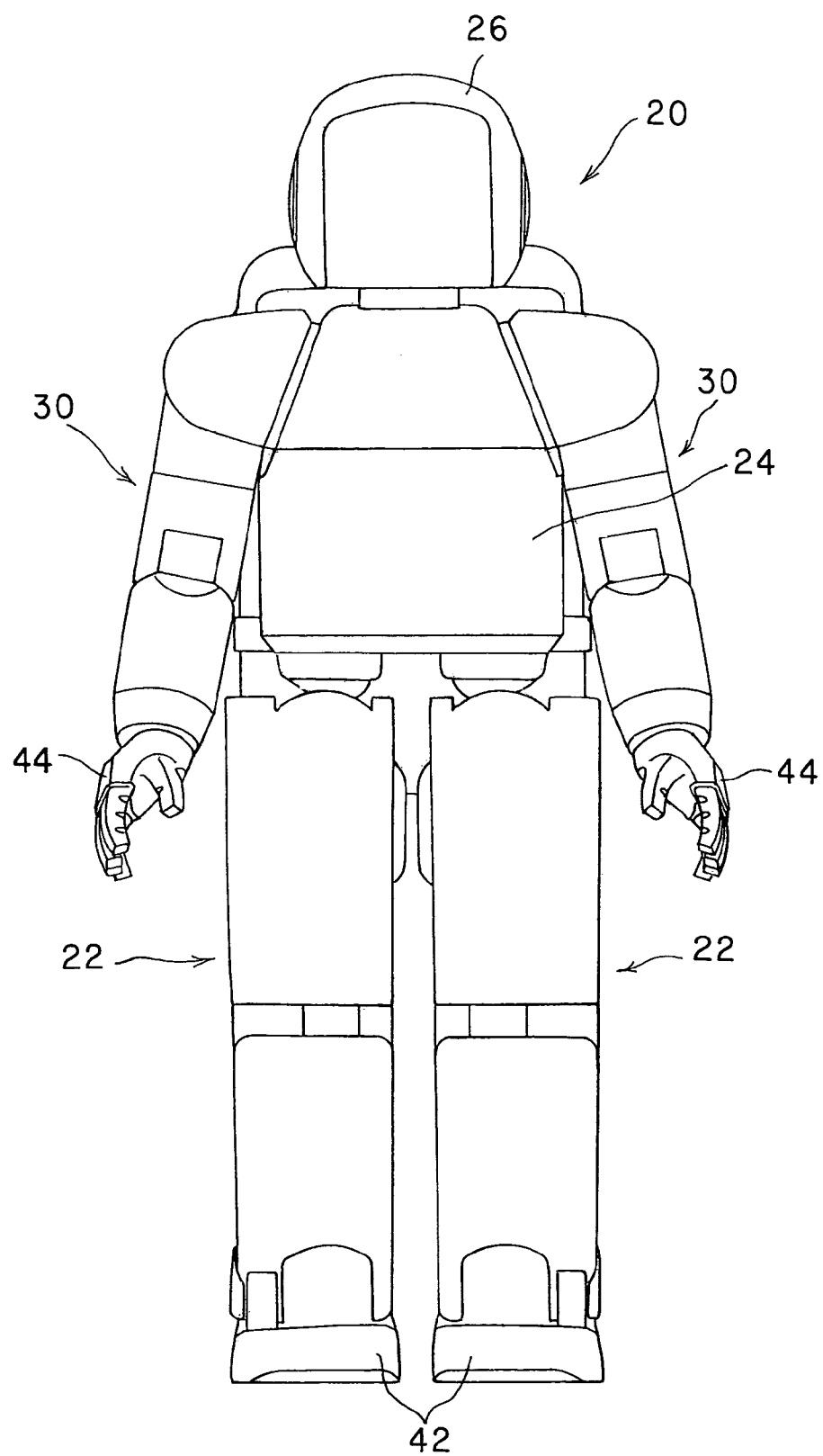
FIG. 3 is a front view of a legged mobile robot (more specifically, biped robot) anticipated to become the "sitter" seated in the movable seat shown in FIG. 1.
Figure 4:
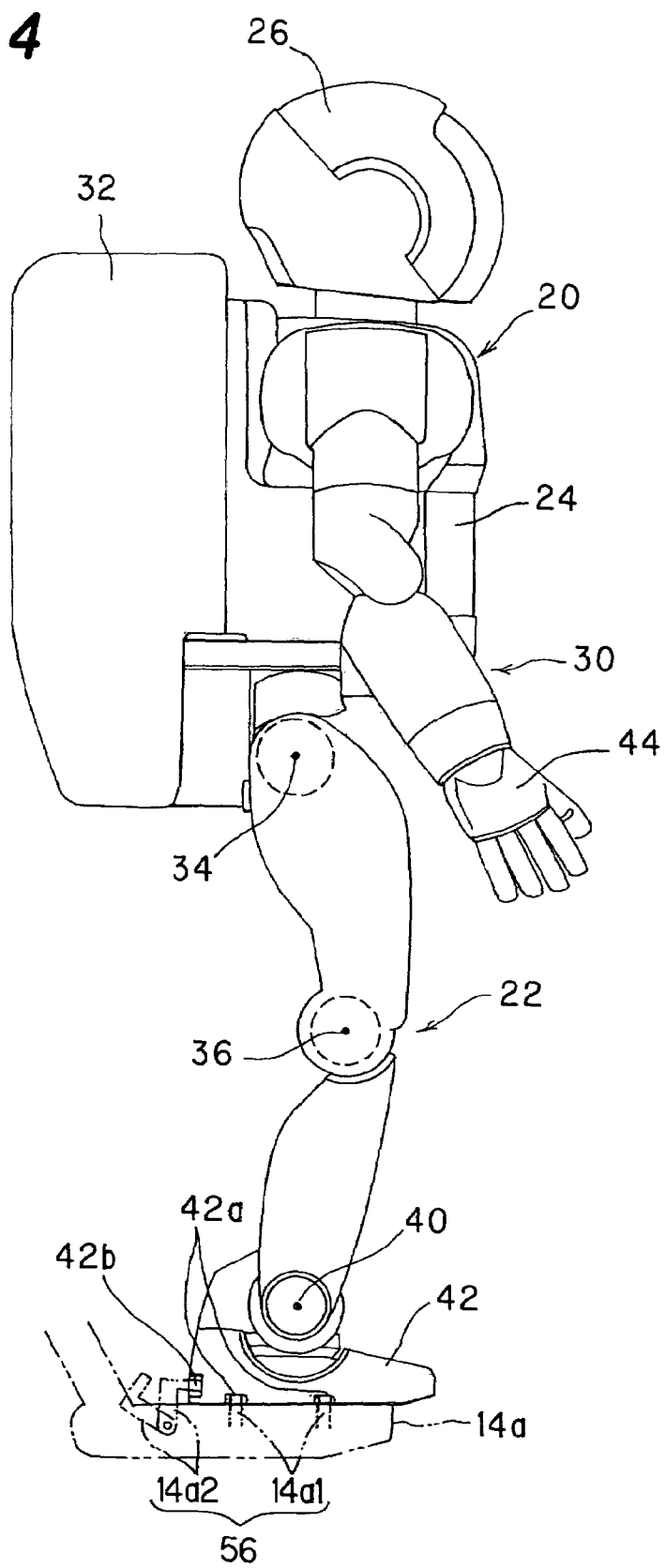
FIG. 4 is a side view of the robot shown in FIG. 3.
Figure 5:
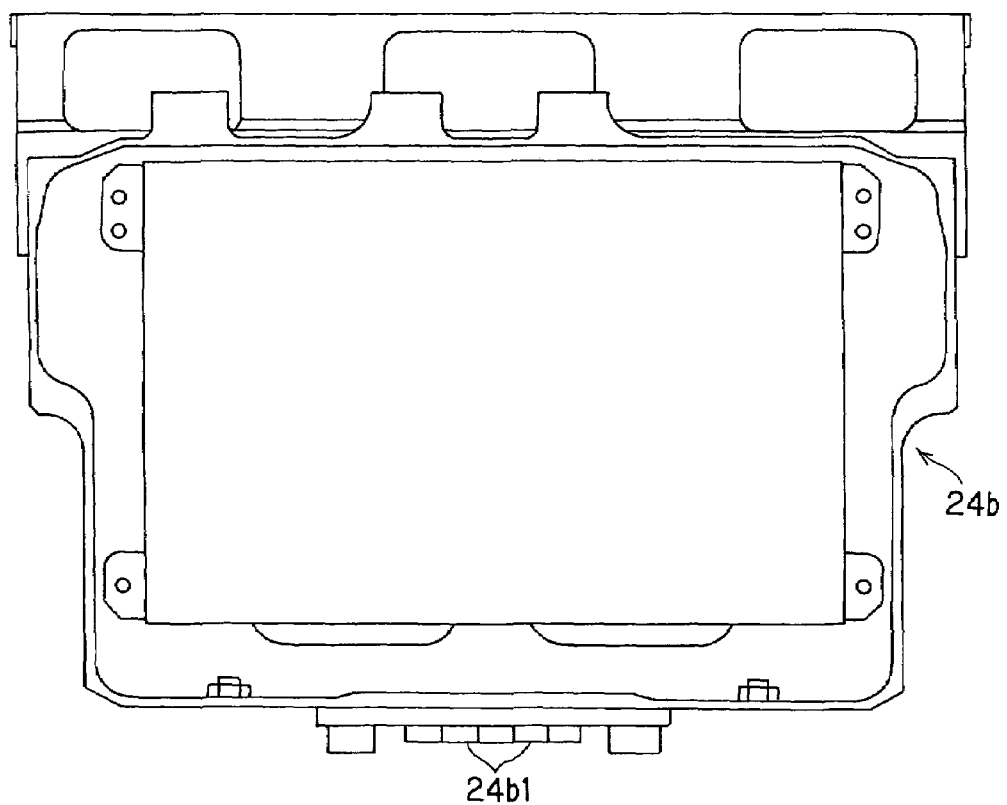
FIG. 5 is a front view of an internal frame of the back of the robot shown in FIG. 3.

FIG. 3 is a front view of a robot 20, FIG. 4 is a side view thereof, and FIG. 5 is a front view of an internal frame of the back of the robot 20.

As shown in FIGS. 3 and 4, the robot 20 has two leg linkages (legs) 22, a body 24 above the legs, a head 26 above the body, and two arm linkages (arms) 30 on opposite sides of the body. As shown in FIG. 4,. a housing unit 32 on the back of the body 24 accommodates, inter alia, an ECU (Electronic Control Unit; not shown) constituted as a microcomputer and a battery (not shown) for supplying power to electric motors (onboard equipment) for driving the joints of the robot 20.

The housing unit 32 on the back of the body 24 is box-like that shown in FIG. 4 and is equipped at the lower interior portion with a frame 24b (shown in FIG. 5). As shown in FIG. 5, the lower edge of the frame 24b is provided with electric terminals 24b1 for enabling charging of the battery power source by the battery (voltage source) of a vehicle 12.

The each of the left and right legs 22 of the robot 20 is equipped with a crotch (hip) joint 34 including a joint around the vertical axis (gravity axis), a roll direction joint (around the advance direction axis) and a pitch direction joint (around the lateral axis); a pitch direction knee joint 36; an ankle joint 40 including a pitch direction joint and a roll direction joint; and a foot 42 at the lower end of the leg 22. The arms 30 are equipped with similarly structured shoulder joints, elbow joints and hand joints, and hands (end effectors) 44 attached to the distal ends of the hand joints.

Two CCD cameras (not shown) are mounted laterally in parallel inside the head 26 so as to produce stereoscopic (binocular) images of the surroundings. The robot 20 stands to a height of about 120 cm and weighs 52 kg.

Thus, the robot 20 has the body 24 and two legs 22 each connected to the body through the crotch joint 34 and each having the knee joint 36 and the foot connected through the ankle joint 40. Owing to the foregoing configuration of the robot 20, the left and right legs 22 are given a total of 12 degrees of freedom, so that by driving the 12 joints to appropriate angles during locomotion, the legs 22 can be driven to enable desired walking (movement) over a floor (road) in three-dimensional space with the feet 42 making contact with the ground. Further, the left and right arms 30 are each given five degrees of freedom, so that desired operations can be carried out in three-dimensional space (working space) by driving these joints to appropriate angles and thus driving the arms 30.

A conventional six-axis force sensor (not shown) is attached to each foot 42 and generates a signal or output representing the floor reaction force acting on the robot 20. An inclination sensor (not shown) is installed on the body 24 and generates signals or outputs representing the inclination relative to vertical axis and the angular velocity thereof. The outputs of the sensors and the image outputs produced by CCD camera imaging are sent to the ECU. The ECU comprises a microcomputer whose CPU executes commands stored in a ROM to calculate, based on the inputted values, electric motor control values (control inputs) required for driving the joints, and outputs the calculated control values to the electric motors through a D/A converter and an amplifier (neither shown).

The joint structure outlined in the foregoing, the configuration of the ECU and other features of the robot 20 are set out in detail in the third reference '226 and will not be explained further here.

As is clear from the description set out above, the word "sitter" as termed in this specification means at least one member of the group composed of a human being and a humanoid robot.

The explanation of FIGS. 1 and 2 will be resumed.

The connecting (or slide) mechanism (now assigned with reference numeral 50) and an electric motor (actuator) 52 for driving the connecting mechanism 50 are installed inside the seat body 14 of the movable seat 10. The electric motor 52 is operated by power supplied from the battery of the vehicle 12.

The connecting mechanism 50 comprises a conventional ball screw driving device in which a lead or guide screw 50a whose opposite ends are supported by bearings 50b, 50c fastened to the seat body 14. The fixture 16a of the seating member 16 is coupled with the lead screw 50a through a nut (not shown) and numerous steel balls are interposed between the lead screw 50a and the nut.

A drive pulley 52a is fastened to the output shaft of the electric motor 52 and the drive pulley 52a is connected with a driven pulley 52c through a belt 52b. The driven pulley 52c is connected to the lead screw 50a of the connecting mechanism 50 at the bearing 50c. As a result, the rotation of the electric motor 52 is transmitted to the lead screw 50a of the connecting mechanism 50, so that the seating member 16 moves leftward in FIG. 1 during forward rotation of the electric motor 52 and moves rightward during reverse rotation thereof. Thus, the seating member 16 is attached to the seat body 14 so as to be movable by the connecting mechanism 50 between a first position and a second position.

As shown in FIG. 1, the seat body 14 is formed with a slot for enabling movement of the fixture 16a of the seating member 16. The slot is covered by a fly 14b to prevent invasion of dust and the like into the connecting mechanism 50.

Figure 6:
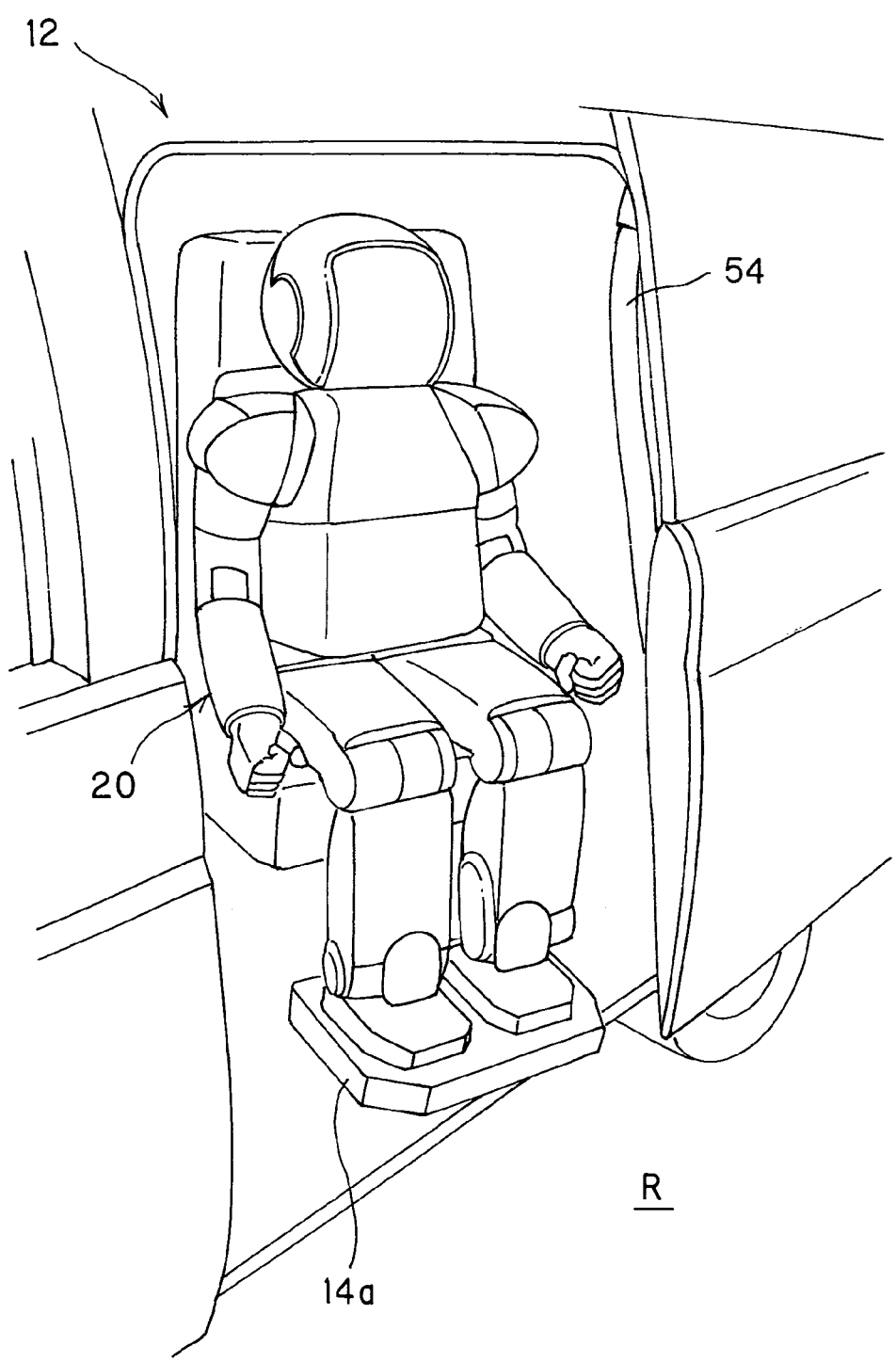
FIG. 6 is an explanatory perspective view showing the robot illustrated in FIG. 3 in the course of being moved, as seated on the movable seat, from inside a vehicle passenger compartment to outside the vehicle (i.e., being moved sideways)
Figure 7:
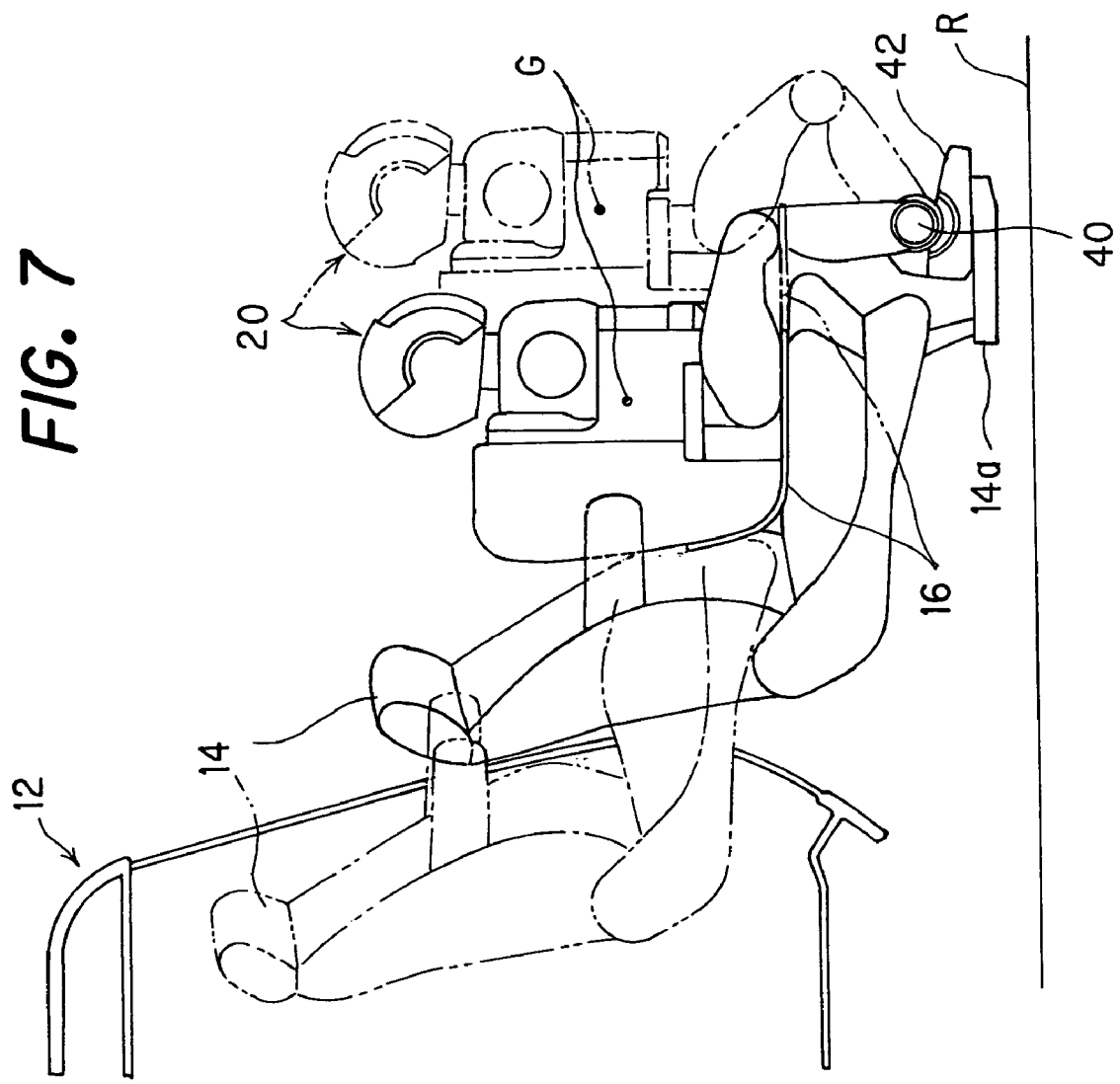
FIG. 7 is an explanatory side view showing the robot illustrated in FIG. 3 after being moved from inside the passenger compartment to outside the vehicle as seated on the movable seat.

FIG. 6 is an explanatory perspective view showing the robot 20 in the course of being moved as seated on the movable seat 10 from inside the passenger compartment 12a to outside the vehicle 12 (being moved sideways), and FIG. 7 is an explanatory side view showing the robot upon completion of the movement.

As shown in FIGS. 6 and 7, the conventional rotate/drive mechanism (not shown) carries the movable seat 10 (i.e., the seat body 14 and seating member 16) outward through a doorway at the side of the vehicle 12 while simultaneously causing it to descend. As a result, the seat body 14 is moved to a location where it comes close or contacts a road surface R, whereby the robot 20 can stand from the seating member 16 onto the road surface R. On the other hand, when the robot 20 is to be boarded or loaded, it is moved into the passenger compartment 12a together with the movable seat 10 as seated thereon by performing the foregoing sequence of operations in reverse. The robot 20 is secured by a seatbelt 54 (shown in FIG. 6) when seated on the movable seat 10, although this is not shown in the drawings.

Further, as depicted by phantom lines in FIG. 4, the foot rest 14a of the seat body 14 is equipped with two rods 14a1 for engagement with two holes 42a formed along the longitudinal center line at the sole of the foot 42 and with a single hook 14a2 for engagement with a hole 42b formed at the heel of the foot. (none of the hooks are shown in FIG. 1). The rods 14a1 and hook 14a2 constitute a foot lock mechanism 56, in which the rods 14a1 and hook 14a2 are driven by a drive mechanism (not shown) to a lock position where the foot 42 is fastened to the foot rest 14a shown by the phantom lines when the robot 20 is seated or to an unlocked position where the foot 42 is made free.

The position of the seating member 16 indicated by phantom lines in FIG. 7 will be referred to as the first position for seating or unseating the robot (sitter) 20 and the position thereof indicated in FIG. 7 by solid lines leftward of the first position where the robot 20 is maintained seated will be referred to as the second position.

The robot 20 is caused to be seated when the seating member 16 is in the first position, whereafter the seating member 16 moves the robot 20 to the second position as still seated. While in the second position, the robot 20 is fixed by the foot lock mechanism 56 and is thereafter moved to the passenger compartment 12a together with the movable seat 10, and is then secured by the seatbelt 54. Then, the vehicle 12 runs to the destination. On arrival, the movable seat 10 is again moved to the state shown in FIG. 7. The seating member 16 is then moved to the first position, where the robot 20 can be unseated.

As is clear from FIG. 7, the seating member 16 is attached to the seat body 14 so that location of the center of gravity (indicated G in FIG. 7) of the robot 20 when seated in the first position is in a predetermined relationship with respect to the seat body 14, more exactly the position of the feet 42 of the robot 20 on the foot rest 14a.

Specifically, the first position is established just beyond the end of the seat body 14 and the seating member 16 is attached to the seat body 14 so that when the robot 20 rests its feet 42 on the foot rest 14a of the seat body 14, the center of gravity G of the robot 20 in the first position at the time of unseating is located at or forward of the foot joints 40 at the foot rest 14a.

The explanation of FIG. 2 will be resumed.

A control box 58 installed in the seat body 14 contains a drive circuit 58a for the electric motor 52 and an electronic control unit (hereinafter called "controller") 58b comprising a microcomputer.

First and second limit switches (recognition switches) 60, 62 of the push-off type are installed near the lead screw 50a of the connecting mechanism 50. Each is equipped with a pin (not shown). The switch contacts are normally ON to produce an ON signal but turn OFF to produce an OFF signal when the pin strikes on the fixture 16a. The first limit switch 60 is located to produce an OFF signal when the seating member 16 is in (arrives at) the illustrated first position. The second limit switch 62 is located to produce an OFF signal when the seating member 16 is in (arrives at) the second position.

A pressure switch 64 (not shown in FIG. 1) is provided on the seating member 16 to produce a signal (a robot-seated confirmation signal) in response to the weight of the robot 20 when it is seated.

Figure 8:
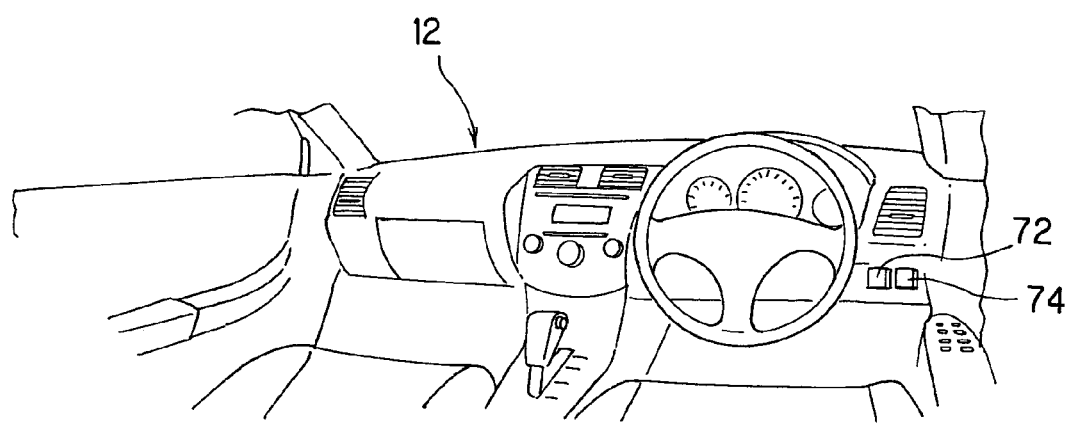
FIG. 8 is an explanatory front view of the vicinity of a vehicle driver's seat shown in FIG. 1.

As shown in FIG. 1, a main switch 70 is provided laterally of seating member 16 and, as shown FIG. 8, a forward switch 72 and a reverse switch 74 are installed at an appropriate location near the driver's seat of the vehicle 12 as start switches.

These switches are located so as to be easily operable from the outside by the operator (the cargo handler when the sitter is the robot 20 and by the person being transported or a caregiver when it is a person). The main switch 70 is for inputting an instruction for enabling movement of the seating member 16; the forward switch 72 is for inputting an instruction to move the seating member 16 toward the first position; and the reverse switch 74 is for inputting an instruction to move the seating member 16 toward the second position.

The outputs of the switches and sensors are sent to the controller 58b on signal lines not shown in the drawings. The controller 58b uses the inputs to control movement of the seating member 16 as explained below.

The operation of the movable seat 10 will now be explained. This operation is controlled by the controller 58b.

Figure 9:
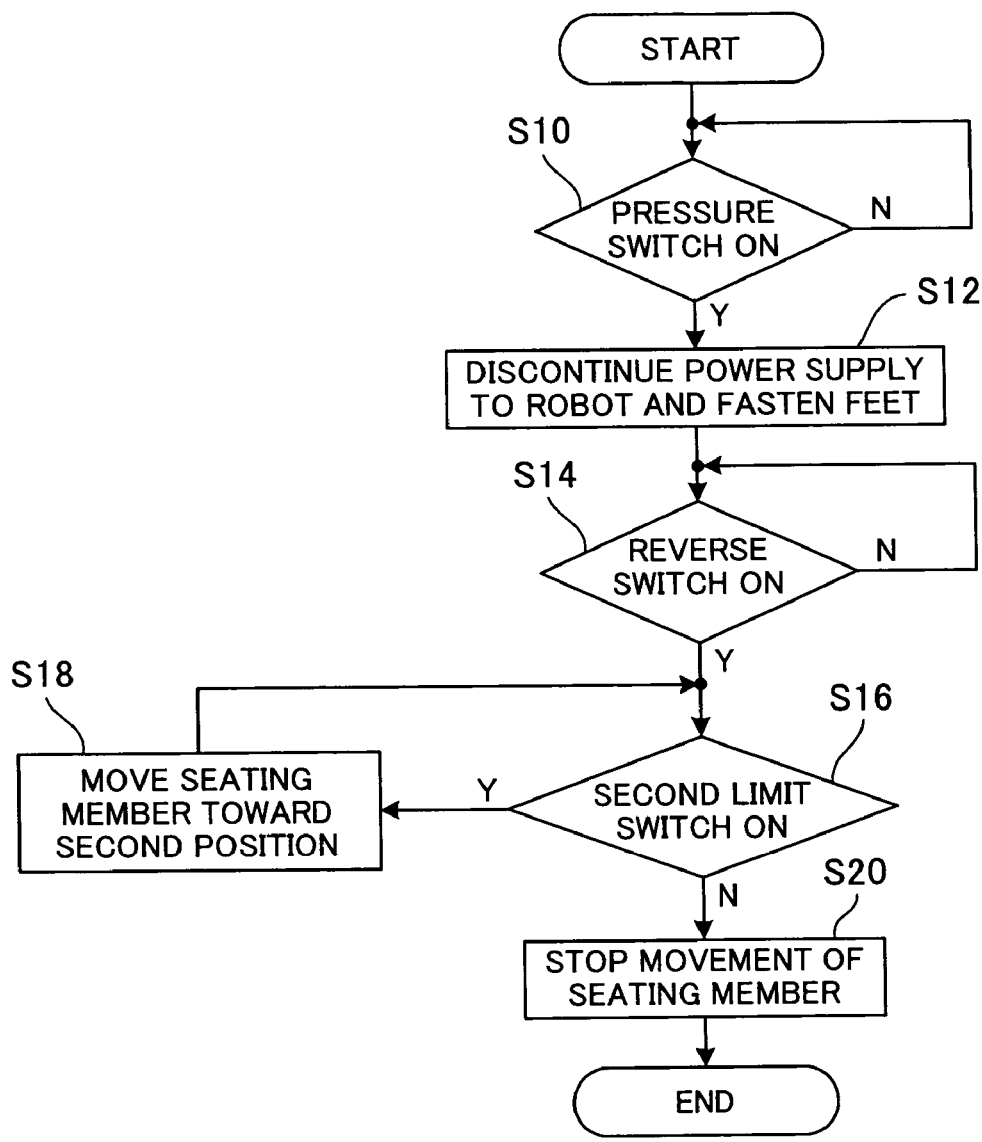
FIG. 9 is a flowchart showing a sequence of operations executed by a controller of the movable seat shown in FIG. 1.

FIG. 9 is a flowchart showing the sequence of operations, particularly those for movement from the first position to the second position, i.e., the sequence of seating operations.

The illustrated sequence of operation is commenced after the movable seat 10 has been moved to outside the vehicle 12 by the rotate/drive mechanism and the main switch 70 has been turned ON.

First it is checked in S10 whether the pressure switch 64 generates an ON signal. When the result is affirmative, i.e., if it is confirmed that the robot 20 is seated on the seating member 16, then in S12, supply of power to the robot is discontinued and the foot lock mechanism 56 is driven to fasten the feet 42 of the robot 20 to the foot rest 14a of the seat body 14.

Next, it is checked in S14 whether the reverse switch 74 generates an ON signal. When the result is affirmative, it is checked in S16 whether the second limit switch 62 generates an ON signal, and when the result is affirmative, the electric motor 52 is driven in reverse in S18 to move the seating member 16 toward the second position. When the result in S16 is negative, since this means that the seating member 16 has arrived at the second position, movement of the seating member 16 is stopped in S20.

As a result, the robot 20 comes to be located at the second position, still seated and fixed to the movable seat 10. Next, in this condition, the robot 20 is carried into the passenger compartment 12a of the vehicle 12 together with the movable seat 10 by the rotate/drive mechanism, whereafter the body 24 is stably secured to the seat body 14 by the seatbelt 54.

Figure 10:
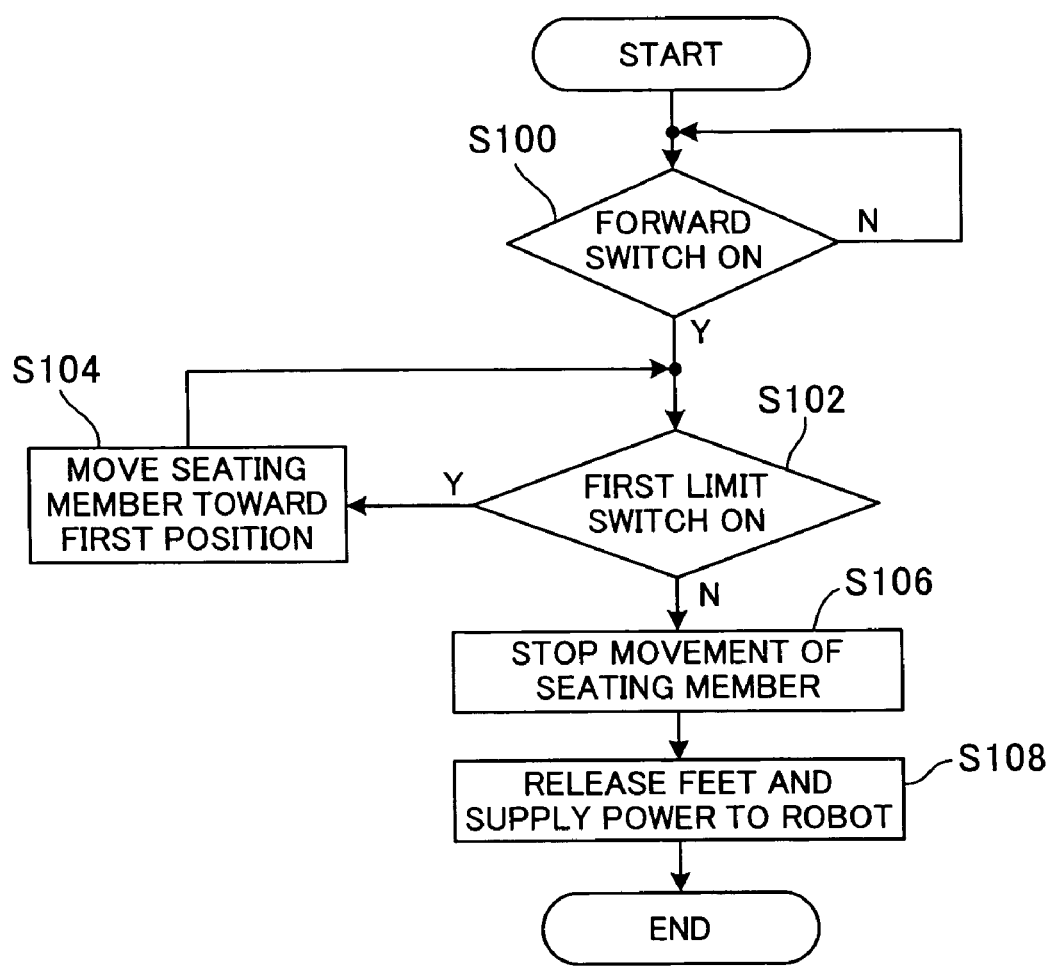
FIG. 10 is also a flowchart showing a sequence of operations executed by the controller of the movable seat shown in FIG. 1.

FIG. 10 is a flowchart showing the sequence of operations of the controller 58b, particularly those for movement from the second position to the first position, i.e., the sequence of unseating operations.

The illustrated sequences of operations is commenced after the seatbelt 54 securing the body 24 has been released and the robot 20 has been moved to outside the vehicle 12 together with the movable seat 10 by the rotate/drive mechanism, and the main switch 70 has been turned ON.

It is confirmed in S100 whether the forward switch 72 generates an ON signal. When the result is affirmative, it is checked in SI 02 whether the first limit switch 60 generates an ON signal. When the result in S102 is affirmative, the electric motor 52 is driven forward in S104 to move the seating member 16 toward the first position. When the result is negative, since this means that the seating member 16 has arrived at the first position, movement of the seating member 16 is stopped in S106.

Next, in S108, the foot lock mechanism 56 is driven to release the feet 42 and power is supplied to the robot 20. As a result, the robot 20 can rise off the seating member 16 under its own power.

Although it has been explained regarding the operations of FIGS. 9 and 10 that the robot 20 is supplied with operating power to enable it to seat or unseat itself under its own power, it is possible instead not to supply operating power to the robot 20 but to put it in a stationary state and have the cargo handler carry the robot 20 to and seat it on the seating member 16 or unseat the robot 20 from the seating member 16.

This embodiment is thus configured to have a movable seat 10 for a vehicle 12 having a passenger compartment; comprising: a seat body 14 shiftable between inside and outside the passenger compartment of the vehicle through a rotate/drive mechanism; a seating member 16 attached to the seat body through a connecting mechanism 50 to be movable between a first position where a sitter (robot 20) is seated or unseated and a second position where the sitter is maintained seated, such that a location of a center of gravity of the sitter, when seated in the first position, with respect to a position of feet of the sitter is in a predetermined relationship; an actuator (electric motor 52) driving the connecting mechanism to move the seating member between the first and second positions; a switch (main switch 72, forward switch 72, reverse switch 74) for inputting an instruction to move the seating member between the first and second positions; and a controller 58b controlling the actuator to move the seating member toward one of the first and second positions in response to the inputted instruction.

This enables reliable seating, unseating, boarding (loading) and alighting (unloading), not only of elderly persons and others requiring special care but also of humanoid robots. In addition, the seating member 16 is attached to the seat body 14 to be movable between a first position and a second position such that a location of a center of gravity of the sitter, when seated in the first position, with respect to a position of feet of the sitter is in a predetermined relationship. With this, when the seating member 16 is attached to a seat body 14 of a welfare vehicle sold in the market, the sitter can be surely board on the vehicle or alight therefrom, as mentioned just below.

In the movable seat, the predetermined relationship is a relationship in which the center of gravity G of the sitter (robot 20) in the first position at a time of unseating is located at or forward of an ankle joint of the sitter. With this, it becomes possible for the sitter to break a balanced condition taken during sitting to stand up, thereby enabling to board or alight surely.

In the movable seat, the sitter is a humanoid biped robot 20 having a body 24 and two legs (leg linkages) 22 each connected to the body through a joint 34 and each having a foot 42 connected through an ankle joint 40. In the movable seat, the robot has an electric terminal 24b1 to be charged from a battery of the vehicle. With this, when the vehicle is a hybrid one, since the capacity of vehicle battery is a limit, surplus energy obtained at regeneration brake can be utilized effectively. In addition, maintenance of the robot 20 including charging will be facilitated.

In the movable seat, the connecting mechanism 59 comprises a ball screw driving device having a lead screw 50a to which the seating member 16 and the actuator (electric motor 52) are coupled.

In the movable seat, the switch comprises: a forward switch 72 for inputting an instruction to move the seating member toward the first position; and a reverse switch 74 for inputting an instruction to move the seating member toward the second position. The movable seat further includes: a main switch 70 for inputting an instruction for enabling movement of the seating member.

In the movable seat, the seat body 14 has a foot rest 14a at its lower portion.

In the movable seat, the foot rest 14a of the seat body 14 is equipped with a foot lock mechanism 56 comprising a rod 14a1 for engagement with a hole 42a formed at a sole of the foot 42 of the robot such that the foot is fastened thereto.

In the movable seat, the rotate/drive mechanism carries the seat body 14 outward through a doorway at a side of the vehicle 12 while causing it to descend until the seat body 14 is moved to a location where it comes close or contacts a road surface R, whereby the sitter can stand from the seating member onto the road surface.

It should be noted that the shape of the seating member 16 is not limited to that illustrated and the seating member 16 can be of any desired configuration insofar it can be attached to the seat body 14 of a special services vehicle or the like so as to be capable of moving relative thereto.

It should also be noted that, although a humanoid biped robot has been taken as an example of a robot in the foregoing description, the robot may instead be one having three or more legs.

It should further be noted that, although an electric motor has been given as an example of an actuator for moving the seating member 16 relative to the seat body 14, the invention is not limited to use of the electric motor.

It should be noted that, in the foot lock mechanism, the number of rods, holes and hook is not limited to those in the foregoing description. For example, a single rod can be used to be engaged with a single hole formed at the foot sole.

Japanese Patent Application No. 2004-173634 filed on Jun. 11, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A movable seat for a vehicle having a passenger compartment; comprising:
    a seat body shiftable between inside and outside the passenger compartment of the vehicle through a rotate/drive mechanism;
    a seating member attached to the seat body through a connecting mechanism to be movable between a first position where a sitter is seated or unseated and a second position where the sitter is maintained seated, such that a location of a center of gravity of the sitter, when seated in the first position, with respect to a position of feet of the sitter is in a predetermined relationship;
    an actuator driving the connecting mechanism to move the seating member between the first and second positions;
    a switch for inputting an instruction to move the seating member between the first and second positions; and
    a controller controlling the actuator to move the seating member toward one of the first and second positions in response to the inputted instruction.

2. The movable seat according to claim 1, wherein the predetermined relationship is a relationship in which the center of gravity of the sitter in the first position at a time of unseating is located at or forward of an ankle joint of the sitter.

3. The movable seat according to claim 1, wherein the sitter is a humanoid biped robot having a body and two legs each connected to the body through a joint and each having a foot connected through an ankle joint.

4. The movable seat according to claim 3, wherein the robot has an electric terminal to be charged from a battery of the vehicle.

5. The movable seat according to claim 1, wherein the connecting mechanism comprises a ball screw driving device having a lead screw to which the seating member and the actuator are coupled.

6. The movable seat according to claim 1, wherein the switch comprises:
   a forward switch for inputting an instruction to move the seating member toward the first position; and
   a reverse switch for inputting an instruction to move the seating member toward the second position.

7. The movable seat according to claim 6, further including:
   a main switch for inputting an instruction for enabling movement of the seating member.

8. The movable seat according to claim 1, wherein the seat body has a foot rest at its lower portion.

9. The movable seat according to claim 3, wherein the seat body has a foot rest at its lower portion.

10. The movable seat according to claim 9, the foot rest of the seat body is equipped with a foot lock mechanism comprising a rod for engagement with a hole formed at a sole of the foot of the robot such that the foot is fastened thereto.

11. The movable seat according to claim 1, wherein the rotate/drive mechanism carries the seat body outward through a doorway at a side of the vehicle while causing it to descend until the seat body is moved to a location where it comes close or contacts a road surface, whereby the sitter can stand from the seating member onto the road surface.

* * * * *